United States Patent Office 3,517,859
Patented June 30, 1970

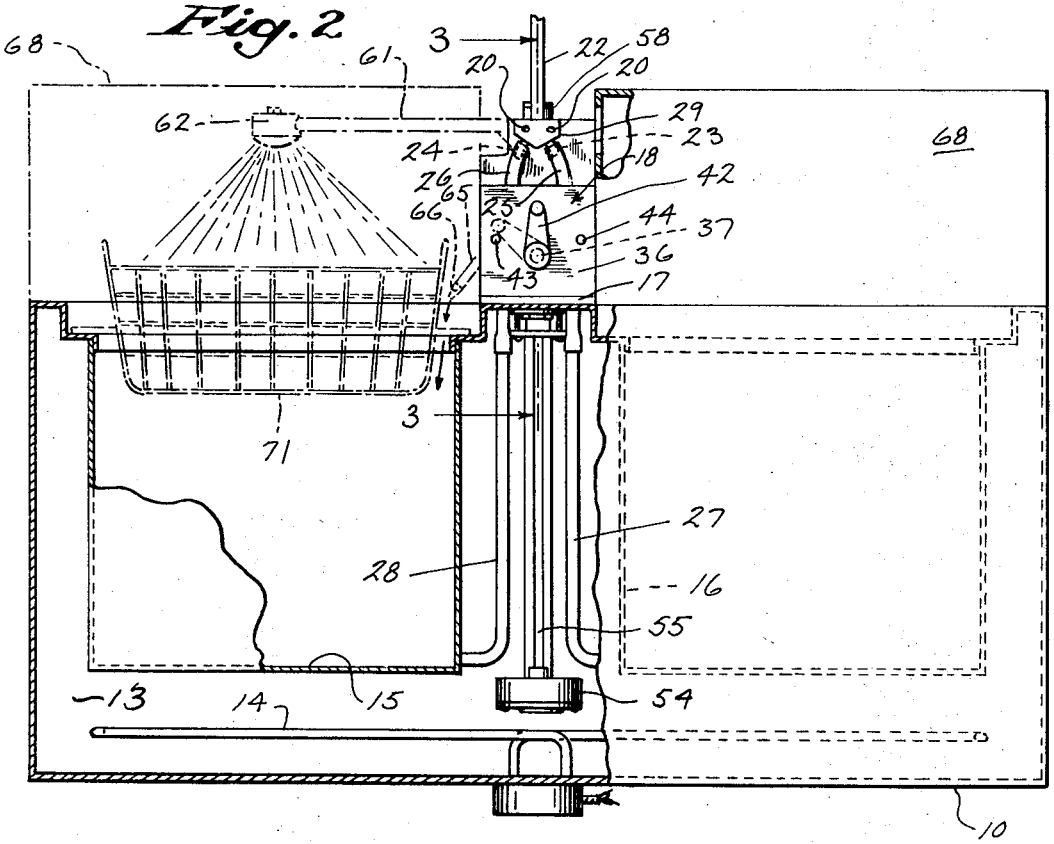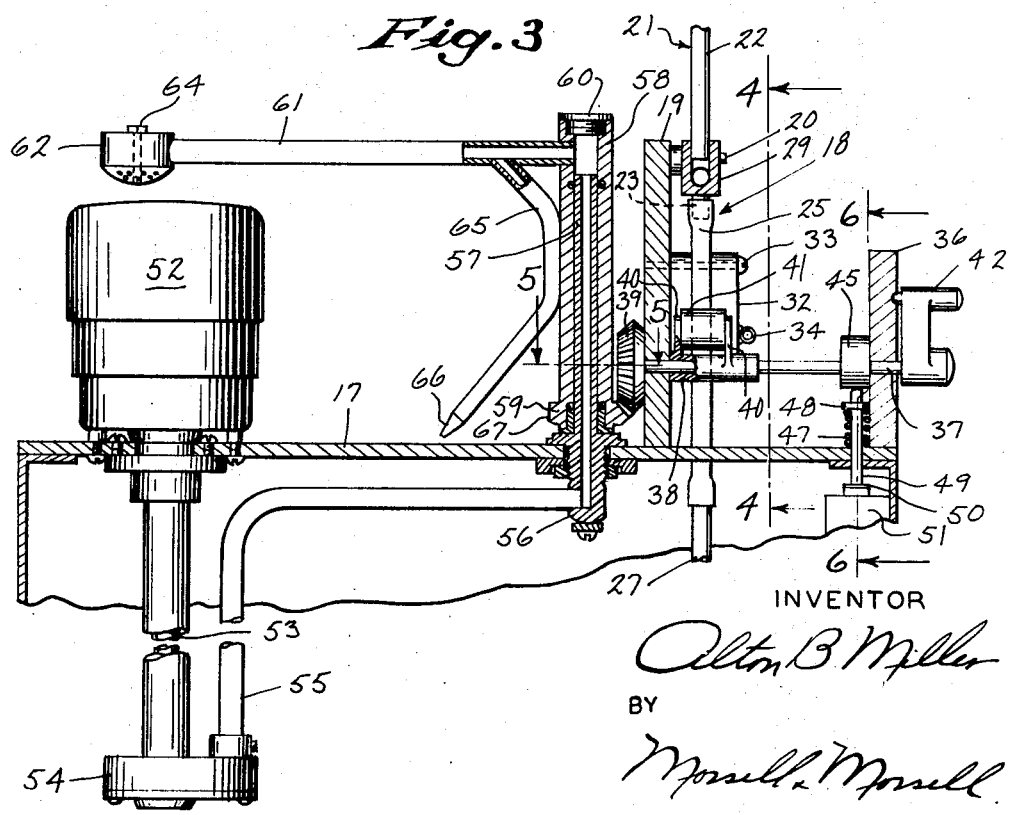

3,517,859
BEVERAGE DISPENSING DEVICE
Alton B. Miller, 2367 Yankee St.,
Niles, Mich. 49120
Filed May 28, 1968, Ser. No. 732,592
Int. Cl. B67d 5/08
U.S. Cl. 222—52                                12 Claims

ABSTRACT OF THE DISCLOSURE

A dispensing device of a type for dispensing a beverage such as coffee having two urns, having a dispensing head connected by dispensing tubes with both urns, and having a spray head swingable over one urn or the other, there being mechanism responsive to swinging movement of the spray head for automatically pinching off the delivery tube for the urn toward which the spray head has been swung for switching on the motor for a pump which delivers liquid to the spray head.

BACKGROUND OF THE INVENTION

Field of the invention

The present invention is particularly suitable for use in the dispensing of coffee in large restaurants or cafeterias from a brewer having two urns so that coffee may always be dispensed from one of the urns even though brewing is taking place in the other urn.

Description of the prior art

Heretofore in coffee dispensing equipment, two urns have been suspended in a tank of hot water with a dispensing mechanism located between the urns. There has also been means for selectively brewing coffee in one or the other of the urns by discharging upwardly pumped hot water into a leaching basket containing the ground coffee. There has also been a dispensing head connected by conduits with the urns whereby coffee may be dispensed from one or the other of the urns. Heretofore it has been general practice to manually insert a clip on a rubber conduit portion leading from the urn where brewing is taking place to prevent the flow of coffee from the latter urn, while permitting coffee to be dispensed from the urn where no brewing is taking place. This was a troublesome procedure, and sometimes the clip was put on the wrong tube so that there was no assurance that coffee was always being dispensed from the proper urn.

SUMMARY OF THE INVENTION

The present invention provides, in a double urn dispenser, means responsive to the swinging of the spray head toward a particular urn for automatically shutting off the flow of coffee from said urn whereby coffee can only be dispensed from the urn where brewing of new coffee is not taking place.

A more specific object of the invention to provide, in a beverage dispenser, means responsive to swinging movement of the spray head toward a particular urn for automatically pinching off a flexible tube from said urn.

A more specific object of the invention is to provide a dispenser as above described having means in connection with the pinch-off mechanism for compensating for minor variations in the diameter of the flexible tubing which is being pinched.

A further object of the invention is to provide in a dispensing device as above described, which includes a motor driven pump for puming heated liquid from a tank into a selected urn by way of a swingable spray head, means responsive to swinging movement of the spray head in one direction or the other for automatically completing the electric circuit to the pump, the circuit being automatically broken when the spray head is in an intermediate or neutral position.

A further object of the invention is to provide a dispensing unit as above described in which the fluid carrying parts are readily removable for cleaning purposes or service.

A further object of the invention is to provide on the swingable assembly, a spray head portion which is readily removable. Thus the spray holes in the spray head may be readily cleaned, when required, so that there is uniformity in water delivery coupled with maximum sanitation.

A further object of the invention is to provide a beverage dispensing device as above described suitable for use either in an arrangement wherein the brewing urns are located under a counter and where the coffee is lifted by a pump to a dispensing head on the counter, or in connection with other known arrangements such as where a two-urn brewer is located on top of the counter and dispensing is by gravity.

With the above and other objects in view, the invention consists of the improved beverage dispensing device, and all of its parts and combinations, as set forth in the claims, and all equivalents thereof.

BRIEF DESCRIPTION OF THE DRAWINGS

In the drawings, illustrating one complete embodiment of a preferred form of the invention, in which the same reference numerals designate the same parts in all of the views:

FIG. 2 is a rear view of the under counter portion of the device of FIG. 1, parts being broken away and shown in vertical section;

FIG. 3 is a sectional view taken approximately along the line 3—3 of FIG. 2;

DESCRIPTION OF THE PREFERRED EMBODIMENT

Figure 1:
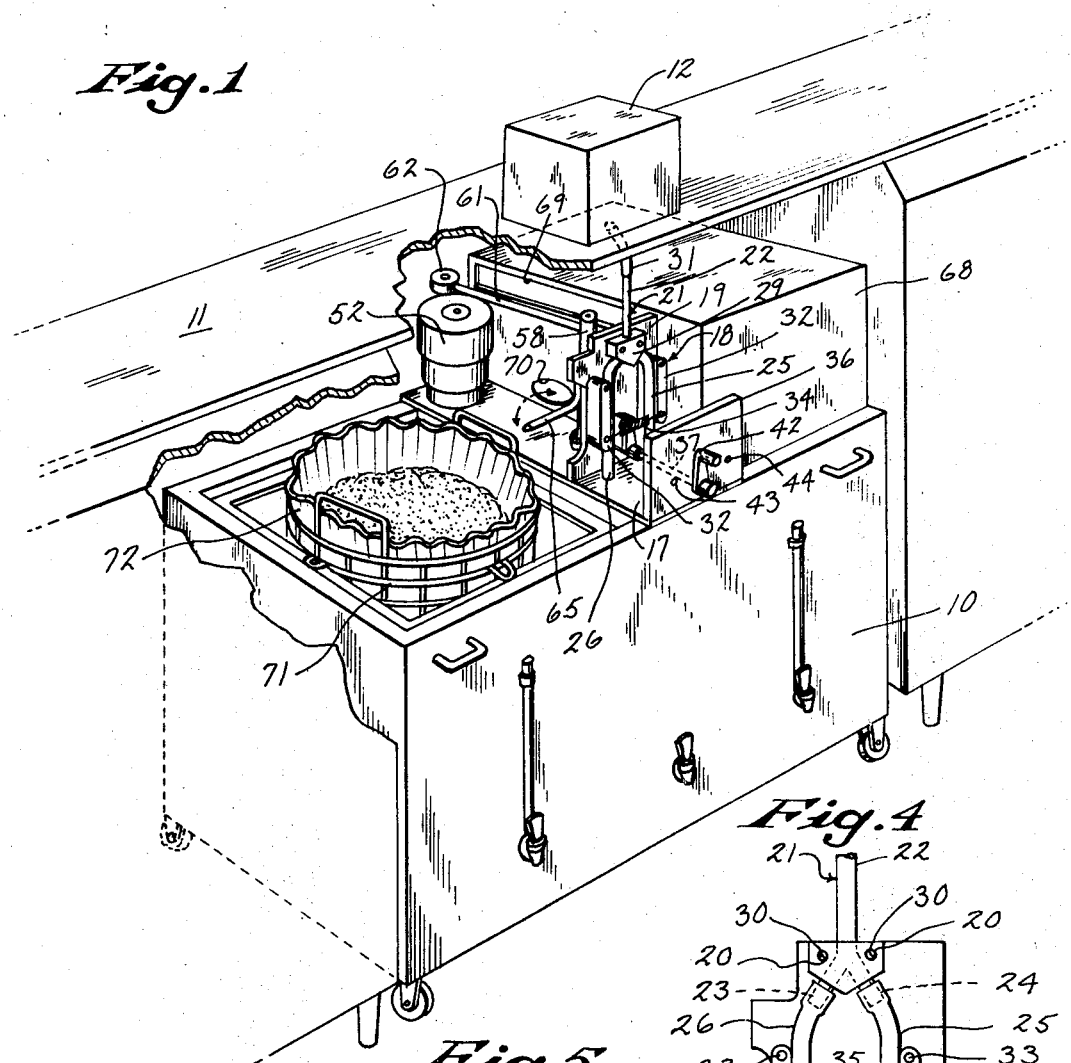
FIG. 1 is a perspective view showing an under the counter coffee brewer, parts being broken away and shown in section, and the cover for one of the urns being removed, there being a leaching basket in position over said urn.

Referring more particularly to the drawings, the numeral 10 designates a two-urn coffee brewer. While the invention is applicable to various arrangements, for purposes of illustration the brewer is shown as located under a counter 11 in a restaurant or cafeteria, there being a dispensing head 12 located on the counter from which a beverage such as coffee may be dispensed into cups or the like. While in the illustrated embodiment the dispensing head must include a lift pump, it is to be understood that the principles of the present invention are applicable to other known arrangements of multiple brewing urns.

Referring now to FIG. 2, the brewing portion 10 forms a chamber 13 for hot water. Within the chamber there may be a suitable heating unit such as the electric heating element 14. Suitably suspended within the hot water chamber 13 are urns 15 and 16. Supported on a transverse platform 17 intermediate the length of the device is switchover mechanism designated generally by the numeral 18. This mechanism includes an upright standard 19 having spaced pins 20 projecting from one of its sides. A Y-fitting 21 has an upwardly-projecting tubular stem 22 which is suitably connected to the dispensing head 12 on top of the counter, and has lower branches 23 and 24 which are connected by rubber tubing 25 and 26, respectively, with stainless steel riser pipes 27 and 28, each one leading from the bottom of an urn. The Y has a supporting block portion 29 formed with spaced openings 30 for receiving the pins 20. With this arrangement the Y may be readily removed by pulling forwardly to withdraw the supporting block 29 from the pins 20. The stem 22 of the Y may then be readily disconnected from the flexible tubing 31 leading to the dispensing head and from the tubes 25 and 26 which connect with the riser pipes. This permits easy cleaning of the parts and quick replacement of the rubber tubing to meet sanitation requirements.

Figure 4:
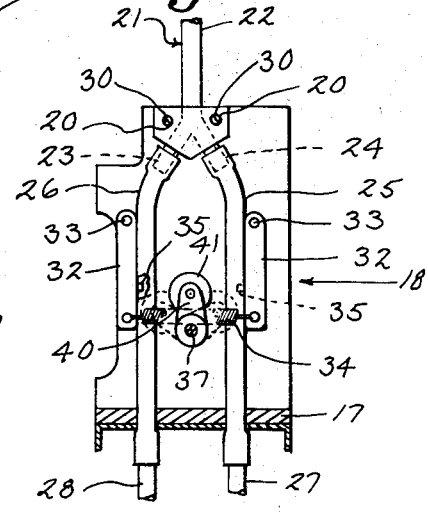
FIG. 4 is a sectional view taken on the line 4—4 of FIG. 3.
Figure 5:
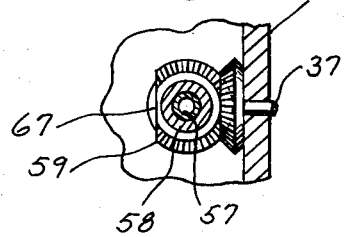
FIG. 5 is a sectional view taken on the line 5—5 of FIG. 3.

The rubber tubes 25 and 26 extend downwardly in front of the standard 19 and adjacent pivoted back-up wings 32 which are pivoted as at 33 to the standard 19. The lower ends of these wings are interconnected by a coil spring 34 which normally urges the wings inwardly against stops 35. Suitably journaled through the standard 19 and through an upstanding plate 36 is a rock shaft 37 carrying a rigid sleeve 38 adjacent the standard 19. The inner end of the shaft 37 carries a bevel gear 39 on the other side of the standard (see FIG. 5). Rigidly supported between longitudinally-spaced ears 40 on the shaft 37 is a pinching roller 41. On the outer end of the shaft 37 is a handle 42 which is swingable from the neutral position shown in FIG. 1 to a stop 43 on the left, or to a stop 44 on the right. When the handle 42 is swung to the left the roller 41 will move to one of the dotted line positions of FIG. 4 to pinch the rubber tube 26 between it and the back-up wing 32 to prevent flow of liquid upwardly through the tube 26 in response to the action of a dispensing pump in the dispensing head 12. When the handle 42 is swung to the right to the other dotted line position of FIG. 4 the roller will pinch off the rubber tube 25 between it and the other wing 32. By having the wings 32 pivotal and spring-urged against the stops 35 they can yield in an outward direction if necessary in order to compensate for variations in the diameter of the tubes 25 or 26. The pinching mechanism constitutes a form of valve means, and it is to be understood that other valve arrangements may be employed, but the improved arrangement is advantageous as the pinch-off is external and hence sanitary. No cleaning of internal valves is required and the tubing sections 25 and 26 may be easily replaced at intervals.

Figure 6:
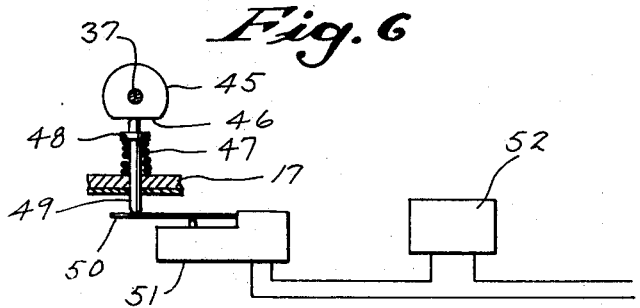
FIG. 6 is a sectional view taken on the line 6—6 of FIG. 3 with a control circuit shown diagrammatically.

Also mounted rigidly on the shaft 37 inwardly of the plate 36 is a cam member 45 (see FIG. 6). This member has a flat peripheral portion 46. When the handle is in the neutral full line position of FIG. 2 the flat is at the bottom as in FIG. 6. This allows the spring 47 to act on the collar 48 of a plunger 49 to urge the plunger in an upwardly direction to an "off" position. If, however, the handle 42 is turned either to the right or to the left the upper end of the plunger 49 will be engaged by a circular portion of the periphery of the cam member 45. This results in depressing of the plunger, causing it to act on the element 50 of switch 51 to close the switch. This will then close the circuit to the pump motor 52 so that control of this motor is responsive to movement of the handle 42 for a purpose to be hereinafter described.

The motor 52 may be mounted on the opposite end of the platform 17 and drives the shaft 53 for a pump 54. The latter is adapted to pump hot water from the tank 13 upwardly through a tube 55 to a tubular fitting 56 at the bottom of the platform 17. The fitting 56 is suitably clamped to opposite sides of the platform 17, and has a tube portion 57 which is upstanding above the platform. A sleeve 58 has a swivel fit on the upstanding tube 57, and at its lower end carries a bevel gear 59 which meshes with the gear 39 on the shaft 37. Thus when the handle 42 is manipulated the bevel gear 39 will act through the bevel gear 59 to cause partial rotation of the sleeve 58 in one direction or the other around the shaft 57. As shown in FIG. 3, the upper end of the sleeve is closed by a removable plug 60. Below the plug there is a laterally-extending tube 61 which carries a spray head 62 on its outer end. The spray head has an apertured bottom plate 63 which is removably held in assembled condition by a bolt 64. By removing the bolt 64 the apertured spray head portion 63 may be removed so that the holes may be cleaned out as well as the interior of the spray head.

A by-pass pipe 65 has its upper end communicating with the lateral extension pipe 61. The pipe has a removable lower nozzle 66 threaded thereon. The pipe is preferably bent to the U shape shown in FIG. 3 so that its intermediate portion can be welded to the exterior of the sleeve 58. Thus the by-pass pipe also serves as a brace for the laterally-projecting tube 61 and spray head. The horizontal bevel gear 59 has a mutilated portion 67 (see FIG. 5). In this way, when the mutilated portion is opposite the bevel gear 39 the sleeve 58 may be readily pulled upwardly for removal purposes. Thus the swivel unit may be readily cleaned.

It is preferred to have a readily removable cover 68 for each urn. Only one of these covers is illustrated in FIGS. 1 and 2, it being understood that there may be another cover positioned as indicated by the dot and dash lines at 68 in FIG. 2. Each cover has a longitudinal slot 69 positioned to allow swinging of the spray head and the lateral pipe 61 in and out of said slot when required. There is also an oval opening 70 (see FIG. 1) to accommodate the nozzle end of the by-pass pipe.

OPERATION

In use of the improved device, coffee is ordinary dispensed from one of the urns while fresh coffee is being brewed in the other urn. When brewing the fresh coffee, a leaching basket 71 containing either a coffee bag or a paper filter 72 with ground coffee therein is supported over one of the urns as in FIG. 1, the cover 68 having been removed as shown to permit insertion. Thereafter the cover may be replaced. Then, by swinging the handle 42 to the left to the stop 43, the shaft 37 will be rocked and this will act through the bevel gears 39 and 59 to swing the spray head 62 from the neutral position of FIG. 1 to a position over the leaching basket as shown in FIG. 2. At the same time the by-pass pipe 65 is swung to the position shown in FIG. 2 to discharge water directly into the urn without passing through the leaching basket. By having a replaceable nozzle 66 of selected size on the by-pass pipe a desired amount of hot water may be by-passed into the urn where brewing is being done. This controls the strength of the coffee. Normally about 30% of the hot water is passed directly into the urn through the by-pass pipe.

As soon as the handle 42 is swung away from the neutral position of FIG. 1 toward the left, the pinching roller 41 will pinch off the tube 26. Thus, as soon as brewing starts in a particular urn it is impossible for coffee to be withdrawn from the bottom of this same urn. Dispensing from the dispensing head 12 on the counter, however, may go on as usual because coffee is being drawn from the other urn through the tube 25 which is not pinched off.

Also, as soon as the handle 42 is turned in one direction or the other the switch 51 will be closed (see FIG. 6) to start the electric motor 50 for the pump 54 so that hot water is delivered from the hot water chamber 13 to the spray head through the pump delivery pipe 55, upstanding tube 57, upper portion of the sleeve 58, and lateral pipe 61. Whenever brewing is completed in the urn the handle 42 is swung back to neutral and the flow of water to the spray head is automatically stopped. Thus it is impossible to have hot water inadvertently flowing when it is not wanted for brewing.

Whenever the beverage in the other urn is used up, then the reverse procedure may be carried out by use of the improved switch-over mechanism; that is, a leaching basket may be placed in the other urn and the handle 42 swung to the right. This causes pinching-off of the tube 25 which then prevents dispensing from the right hand urn and permits dispensing through the tube 26 and counter dispensing head 12 from the left hand urn.

While there has been illustrated and described an under the counter brewing unit, it is to be understood that the invention is applicable to any brewing unit where there are two urns and where brewing is to take place in the one urn while the beverage is dispensed from the other urn, it being immaterial for purposes of the present invention whether the beverage is pumped in an upward direction to a counter dispensing head 12 or whether the beverage is dispensed in a downward direction by gravity or other known means. While the invention finds its greatest utility in a coffee brewer, it is obviously applicable to other liquid food items, where one of a pair of urns must be refilled while there is dispensing from the other.

Various other changes and modifications may be made without departing from the spirit of the invention, and all of such changes are contemplated as may come within the scope of the claims.

What I claim is:

1. In a beverage dispenser having two urns, having a refilling head mounted for movement to deliver into a selected urn, having a dispensing tube leading from each urn, and having shut off valve means for controlling the flow through said dispensing tubes, the improvement comprising common means for simultaneously causing movement of said refilling head to a position over one of said urns and operation of said shut off valve means to prevent flow through the dispensing tube of said urn while permitting flow through the dispensing tube of the other urn.

2. In a beverage dispensing device having two urns, having a refilling head mounted for movement to deliver into a selected urn, and having a dispensed tube leading from each urn, the improvement comprising means responsive to movement of said refilling head to a position over one of said urns for preventing flow through the dispensing tube of said urn while permitting flow through the dispensing tube of the other urn, in which the dispensing tube leading from each urn includes a flexible section, and in which there is tube-pinching means movably mounted adjacent said flexible tube sections, and means responsive to movement of said refilling head to a position over one of said urns for moving said tube-pinching means to a position to pinch off the dispensing tube of said urn.

3. A beverage dispensing device as claimed in claim 2 in which there is a common manually operable member for moving said refilling head and said tube-pinching means.

4. A beverage dispensing device as claimed in claim 2 in which the refilling head and tube-in pinching means are mounted for swinging movement.

5. A beverage dispensing device as claimed in claim 2 in which there is a yielding mounted back-up wing for each flexible tube section against which the tube is adapted to be pressed by the tube-pinching means.

6. A beverage dispensing device as claimed in claim 4 in which there is a manually operable rock shaft on which the swingable tube-pinching means is mounted and in which there is means between said rock shaft and refilling head for causing the swinging movement of the latter.

7. A beverage dispensing device as claimed in claim 2 in which there is a by-pass tube mounted for movement with said refilling head, and having an inlet end in communication therewith and having a discharge end positioned to discharge directly into an urn when the head is positioned thereover.

8. A beverage dispensing device as claimed in claim 1 in which the refilling head includes a rockably mounted upright sleeve for receiving refilling liquid, and a tube projecting horizontally from an upper portion of said sleeve, and in which there is a common manually operable means for rocking said sleeve and for controlling flow through the dispensing tubes from the urns.

9. A beverage dispensing device as claimed in claim 8 in which there is a by-pass tube having an upper end in liquid communication with said horizontal tube and having a lower discharge end, and in which an intermediate portion of said by-pass tube is connected to said sleeve, said by-pass tube being so disposed as to serve as a brace between said sleeve and horizontal tube.

10. In a beverage dispensing device having two urns, a rockably mounted upright sleeve for receiving refilling liquid, a tube projecting horizontally from an upper portion of said sleeve and having means at its end for discharging liquid, a rockably mounted shaft, and means between said shaft and sleeve for swinging the latter when the shaft is rocked, in which there is a dispensing tube leading from each urn which includes a flexible section, and in which there is a pinching roller on said rock shaft positioned to engage the flexible section of the tube for the urn over which the dispensing head is positioned.

11. A beverage dispensing device having two urns, dispensing tubes leading from said urns and including a spaced flexible section for each urn, a rockably mounted shaft journalled between said flexible sections, a pinching roller mounted on said shaft to be swung thereby when the shaft is rocked and positioned to pinch off the flexible tube for one urn when the rock shaft is rocked in one direction and to pinch off the flexible tube for the other urn when the rock shaft is rocked in the other direction.

12. A beverage dispensing device having two urns, having are filling head mounted for movement for delivering into a selected urn, having a dispensing tube leading from each urn, having valve means for said dispensing tubes, and having moving means for said refilling head, the improvement comprising actuating connections between said moving means for the refilling head and said valves whereby when the refilling head is in position over one of the urns the valve for said urn is shut off while the valve for the other urn is open.

References Cited
UNITED STATES PATENTS

| | | | |
|---|---|---|---|
| 3,085,880 | 4/1963 | Matty | 99—283 |
| 3,126,812 | 3/1964 | Nau | 99—283 |
| 3,291,033 | 12/1966 | Curtis et al. | 99—283 |
| 3,411,534 | 11/1968 | Rose | 251—9 |
| 3,433,149 | 3/1969 | Karlen et al. | 99—282 |

ROBERT B. REEVES, Primary Examiner

H. S. LANE, Assistant Examiner

U.S. Cl. X.R.
99—280; 222—536